United States Patent [19]

Maier

[11] Patent Number: 5,250,184

[45] Date of Patent: Oct. 5, 1993

[54] PROCEDURE FOR THE PREPARATION OF MICROPOROUS CERAMIC MEMBRANES FOR THE SEPARATION OF GAS AND LIQUID MIXTURES

[75] Inventor: Wilhelm F. Maier, Mülheim/Ruhr, Fed. Rep. of Germany

[73] Assignee: Studiengesellschaft Kohle mbH, Mulheim, Fed. Rep. of Germany

[21] Appl. No.: 882,210

[22] Filed: May 13, 1992

[30] Foreign Application Priority Data

May 27, 1991 [DE] Fed. Rep. of Germany ....... 4117284

[51] Int. Cl.$^5$ .............................................. B01D 61/00
[52] U.S. Cl. .................................. 210/653; 210/490; 210/500.25; 210/500.26; 210/510.1; 428/315.5; 96/10; 96/11
[58] Field of Search ............. 210/490, 500.25, 500.26, 210/510.1, 653; 55/16, 158; 264/43, 44, 45.1, 56; 427/246; 428/304.4, 315.5; 501/12

[56] References Cited

U.S. PATENT DOCUMENTS

| | | | |
|---|---|---|---|
| 3,692,087 | 9/1972 | Eberts . | |
| 4,935,139 | 6/1990 | Davidson et al. | 210/490 |
| 4,938,870 | 7/1990 | Butler et al. | 210/490 |
| 4,946,592 | 8/1990 | Galas et al. | 210/490 |
| 4,968,426 | 11/1990 | Hay | 210/490 |
| 5,006,248 | 4/1991 | Anderson et al. | 210/500.25 |
| 5,096,745 | 3/1992 | Anderson et al. | 264/43 |
| 5,104,539 | 4/1992 | Anderson et al. | 210/510.1 |
| 5,104,546 | 4/1992 | Filson et al. | 210/653 |
| 5,160,618 | 11/1992 | Burggraaf et al. | 210/490 |
| 5,169,576 | 12/1992 | Anderson et al. | 264/43 |
| 5,194,200 | 3/1993 | Anderson et al. | 264/56 |

FOREIGN PATENT DOCUMENTS

| | | |
|---|---|---|
| 0097770 | 1/1984 | European Pat. Off. . |
| 0195549 | 9/1986 | European Pat. Off. . |
| 0397216 | 11/1990 | European Pat. Off. . |
| 0428052 | 5/1991 | European Pat. Off. . |

*Primary Examiner*—Robert A. Dawson
*Assistant Examiner*—Ana M. Fortuna
*Attorney, Agent, or Firm*—Sprung Horn Kramer & Woods

[57] ABSTRACT

Microporous membranes for the separation of gas and liquid mixtures. The new membranes show a temperature stability up to 500° C. and a gas separation with separation factors better than the Knudsen limit. Continuous microporous inorganic membranes of any desirable thickness can be prepared by e-beam evaporation of metal oxides on a support membrane, which has substantially larger pores than the metal oxide membrane. It is advantageous when the support membrane consists of the same material as the microporous membrane. The membranes are of porous structure with a narrow pore size distribution of pores, where the majority of the pores have diameters smaller than 1 nm. The membranes can be used in all areas of gas and liquid separation, where the selective separation of smaller molecules from mixtures is desired (f.e. gas concentration by removal of water from natural gas, hydrogen from synthesis gas); for the concentration of aqueous solutions (fruit juices with retention of aroma compounds, vitamins and other compounds important for the flavor and nutritional value of the juice; biological liquids like lymphe, blood, or others with retention of valuable compounds including small peptides, hormones, antibiotics and others) and for the concentration of organic solutions with retention of molecules larger than the solvent including oligomers and polymers; and for the concentration of waste water with retention of organic contaminants like phenol resins and coal oil at coking plants. If the membranes have been made catalytically active, the membranes can also be used for the selective and poison resistant conduction of heterogeneously catalyzed three phase reactions by having the reaction gas diffusing through the catalytically active membrane to react at the other side of the membrane with the liquid, consisting of molecules too large to penetrate the pores.

14 Claims, 2 Drawing Sheets

PROCEDURE FOR THE PREPARATION OF MICROPOROUS CERAMIC MEMBRANES FOR THE SEPARATION OF GAS AND LIQUID MIXTURES

This invention is concerned with the preparation of continuous microporous inorganic membranes of controlled pore size by electron beam evaporation. Such membranes are of great practical interest for the transport of gas and water because of the potential application to many separation problems in the liquid and the gas phase, where separation by molecular size differences is desirable or required.

In numerous processes individual gases have to be separated from mixtures like water in natural gas, hydrogen from carbon monoxide, hydrogen from methane or oxygen from nitrogen. This is usually achieved by distillation or by cryogenic procedures, both of which require a lot of energy. Concentration of solutions through the removal of small molecules like water from fruit juice or from biological fluids like milk or blood with retention of larger molecules like oligo-and polysaccharides, proteins, aroma compounds, vitamines and others are as much of general importance as are the removal of solvent from process solutions or the preparation of ultrapure water by pervaporation through inorganic membranes (Suzumura, Yanaka, JP 63134093 A 2, June 2, 1988).

The membranes used for gas separation are commonly polymer membranes, which do not separate by pore size but by the different solubility of the gases in the polymer matrix. So is the separation of nitrogen from natural gas improved upon by the use of polymer membranes (M. S. A. Baksh, A. Kapoor, R. T. Yang, Sep. Sci. Technol. 25 (1990) 845). A problem of polymer membranes is their inselectivity for the separation of inpolar small gases like hydrogen from argon or methane from other hydrocarbons. Another disadvantage of polymer membranes is their low thermal resistance, which usually forbids the separation at temperatures above 150° C. Alternative membranes are being prepared by SOL-GEL procedures, but the separation factors are commonly below the Knudsen limit (square root of the molar weight ratio of the gases (Klein, Gizpec Ceram. Bull. 69 (1990) 1821: Suzuki, Ononato, Kurokawa, J. Noncryst. Solids 94 (1987), 160). This indicates that the pores are still too large (>1 nm) to observe a sieving effect. Smaller pores are approached by the preparation of zeolite membranes (Bein, Brown, Enzel, Brinker, Mter. Res. Soc. Symp. Proc 121 (1988), 761: Oayama, Masatsugu, JP 63291809-A 2, 1988); technical application of zeolite membranes is obstructed by the apparently unavoidable formation of pin-holes. Another method for the preparation of ceramic membranes is CVD (chemical vapor deposition) (Mori, Fujita, JP 61238303 A 2, October 1986;Lin, Fransen, DeVries, Burggraf, Proc. Electrochem. Soc. 90-12 (1990) 539), which produces pore size distributions of 1-50 nm, but due to the high production costs and low separation effectivity CVD is not competitive to other methods. Sintered ceramic membranes made of a wide range of metal oxides (U.S. Pat. No. 4,946,592) provide rather large pores (20-20,000 nm). In another procedure for the preparation of inorganic membranes with the aid of polymers, that are burned off after preparation (U.S. Pat. No. 4,980,062) give membranes with pore diameters of 100 to 500 nm, incorrectly claimed as microporous. α-alumina ceramic membranes with effective pore sizes of about 50 nm can be made from boehmite sols seeded with varying α-alumina particles (U.S. Pat. No. 4,968,426). Multilayered ceramic films with pore sizes in the upper mesopore range (10-20 nm) have been prepared from metal oxide particles (EP 0 426 546 A 2) without giving examples of separations. A SOL-GEL procedure for the preparation of metal oxide ceramics (EP 0 425 252 A 1) gives membranes with mean pore diameters, not exceeding 4 nm. Hydrogen selective inorganic membranes of unknown separation mechanism have been prepared by closing the pores of the support membrane by CVD (Tsapatsis, Kim, Nam, Gavalas, Ind. Eng. Chem. Res. 30 (1991), 2151).

No methods have been known to produce continuous inorganic membranes with confirmed pore diameters of less than 1.2 nm. We have found, however, that continuous inorganic membranes with pore diameters below 1 nm can be prepared by e-beam evaporation of inorganic oxides. (With continuous we mean a homogeneous uniform material even at the nm-scale.) According to this invention continuous microporous materials can be prepared by e-beam evaporation in a vacuum chamber by heating the starting material with an e-beam of at least 2 kW until it evaporates and condenses on a suitable support material. In this procedure the porosity of the material produced is not sensitive to the method of evaporation. Thin continuous films of any thickness with a better than nm precision can be prepared by this condensation method. Layer thickness can be controlled by a film thickness monitor. The pore size distribution of the membrane is determined by the nitrogen adsorption isotherm with many data points in the pressure range below 10 torr. The data treatment can be done with the t-plot method or by the method of Horvath and Kawazoe.

The invention will be further described with reference to the accompanying drawings, wherein.

Figure 1:
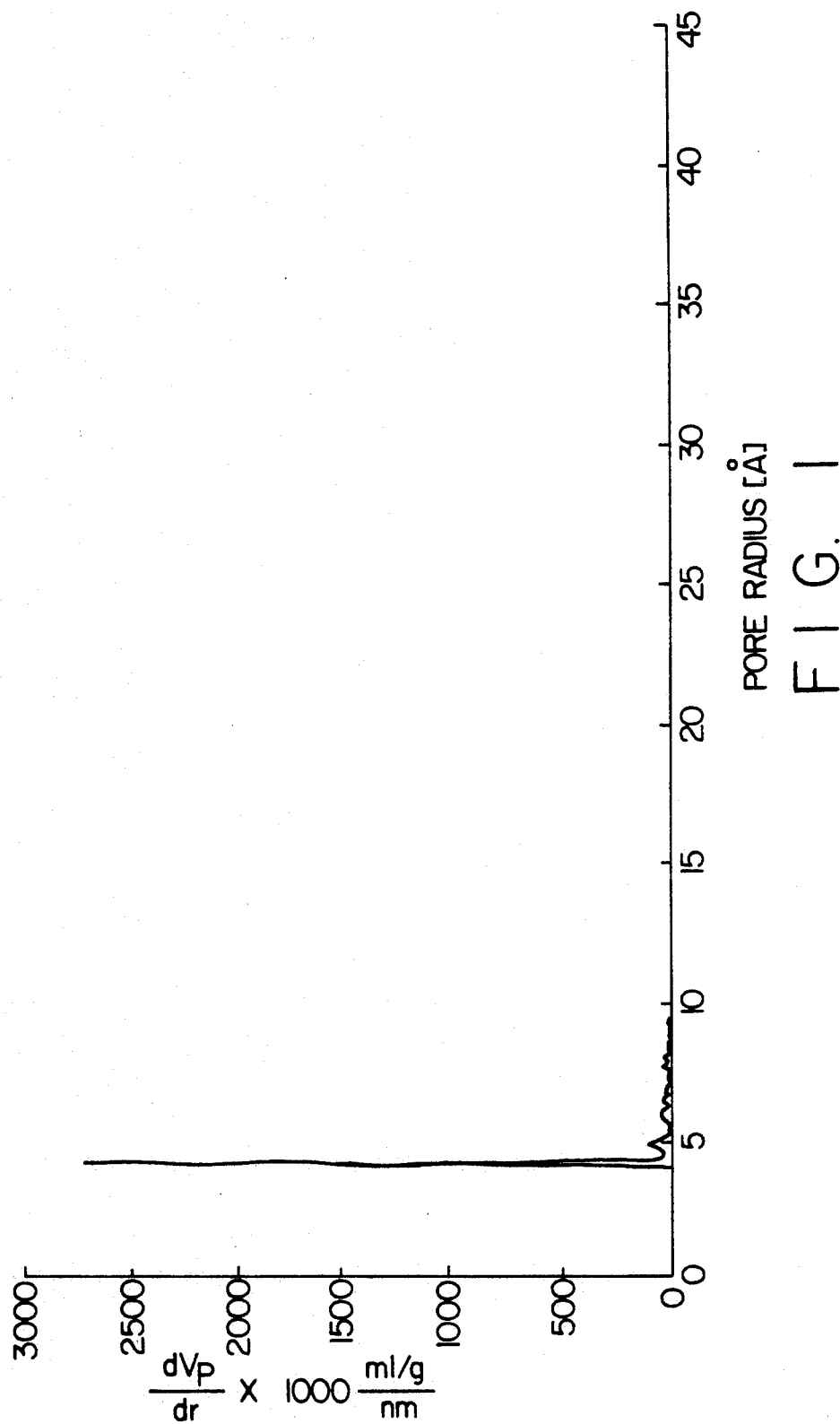
FIG. 1 is a plot of the pore size versus frequency of a membrane in accordance with the invention.

Referring now more particularly to the drawings, FIG. 1 shows the size distribution of the pores of a membrane produced in accordance with the present invention determined by the nitrogen adsorption isotherm in an equipment with high sensitivity in the pressure range below 10 torr. The data were treated by the method of Dubinin (Dubinin Co. Interface Sci. 23 (1967) 478) and the t-plot-method (Mikhail, Brunauer, Bodor J. Coll. Int. Sci. 26 (1968) 45). Aerosil 200 was used as an unporous reference material.

Membranes suitable for gas separation can be prepared by condensation of the membrane on a mesoporous support membrane with symmetrical or asymmetrical pores of pore diameters larger than 5 nm, but smaller than 2 μm. Such support membranes, made of alumina or silica, are available commercially. Only flat membranes or capillary membranes qualify. The microporous membrane for the separation has to be deposited on the outside of the capillary and on the side of the bottle neck pores on asymmetrical flat membranes. Mesoporous capillary membranes have to be rotated stepwise or continuously during the condensation to achieve a homogeneous layer formation on the outer surface.

Such membranes can be used in commercial filtration units or capillary reactors for liquid or gas separation at temperatures up to 500° C. The separation efficiency increases with increasing pressure difference between permeate and feet. Best separation results are achieved by excess pressure on the feed and reduced pressure on the permeate side.

Suitable materials for the membranes are metal oxides of high thermal and chemical resistance like silica, alumina, titania, zirkonia and cer oxide.

The membranes can principally be used for the following applications:

Separation of ethane/ethene, propane/propene, methane/nitrogen, methane/water, oil/asphalt, ammonia/hydrogen/nitrogen, hydrogen/carbon monoxide. The membranes can be used to separate the water from fruit juices without loss of larger molecules like aroma compounds, fruit acids, vitamines and other important juice components. Similarly biological fluids can be concentrated by the removal of water while biologically important compounds like small peptides, hormones and others will be retained. The membranes can also be used for the preparation of ultrapure water. The removal of water from waste water, like the retention of the coal oil from the waste water from a coking plant should be possible with such a membrane. The membranes can also be used for the separation of solvents with retention of dissolved compounds like oligomers, polymers, unknown hazardous compounds or side products. If the membranes contain catalytically active centers like catalytically active metals, the membranes can be used for three phase reactions, where the reactant gas (hydrogen, oxygen, carbon monoxide or halogen) pass the membrane and react with the reactant liquid on the other side of the membrane.

EXAMPLE 1

Figure 2:
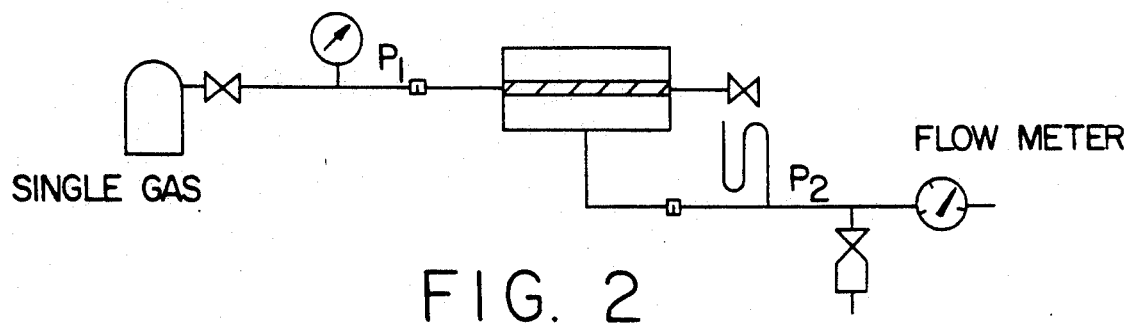
FIG. 2 is a schematic view of an apparatus for use of a novel capillary for gas permeation.

A mesoporous BIORAN-glass capillary from the SCHOTT company (pore diameter 10 nm) was coated with silica at $10^{-5}$ to $10^{-4}$ torr e-beam evaporation of quarz in an evaporation chamber. The capillary was turned continuously 40 times/min during the deposition to assure a uniform deposition of the silica on the outer side of the capillary. The deposition at a rate of about 10 nm/min was controlled by a film thickness monitor and terminated at a layer thickness of 500 nm, which corresponds to a layer thickness of 160 nm on the capillary. The capillary was mounted in the apparatus shown in FIG. 2 and sealed by a silicon polymer. The gas permeation of several gases was determined at various pressures. The results, shown in the following table, demonstrate that at these conditions only the gas isobutane is strongly hindered in its diffusion, while all other gases can be characterized by Knudsen diffusion. This indicates a molecular sieving diameters of the size of molecules.

Table: Separation factors relative to hydrogen determined by gas separation through a glass capillary covered by a microporous silica membrane at various pressures. The permeation factors are given as the ratio of the space velocities $V_{H_2}/V_{gas}$.

| Gas | 0.5 bar | 1 bar | 2 bar | theor. Value* |
|---|---|---|---|---|
| CO | 3.2 | 3.3 | 3.6 | 3.7 |
| N$_2$ | 3.0 | 3.1 | 3.3 | 3.7 |
| i-butane | 10.7 | 178.0 | 339.0 | 5.4 |
| Ar | 3.6 | 3.8 | 4.4 | 4.4 |
| CH$_4$ | 2.2 | 2.3 | 2.5 | 2.8 |
| He | 1.8 | 1.6 | 1.6 | 1.4 |

*(M 1/M 2)$^{0.5}$

EXAMPLE 2

Figure 3:
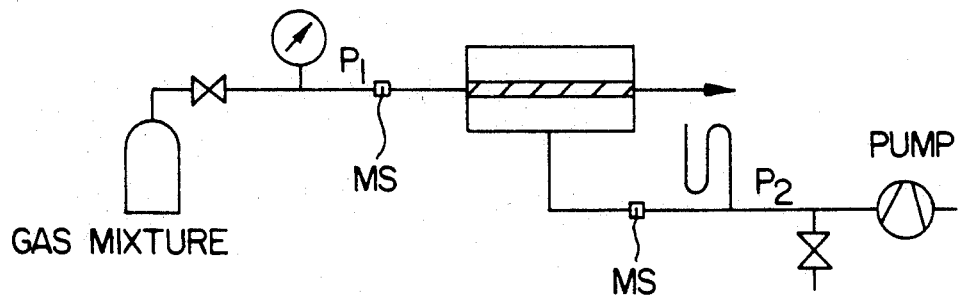
FIG. 3 is a schematic view of an apparatus for use of a novel capillary for gas separation.

A mesaporous BIORAN-glass capillary (pore diameter 10 nm) was coated with a silica membrane as in Example 1. The capillary was mounted in an apparatus shown in FIG. 3, sealed by silicon. The separation of the membrane with several gas mixtures was determined at various pressure gradients with an on-line quadrupole. The composition was obtained through the calibrated ion pressure. All mixtures show separation factors better than Knudsen supporting the high separation efficiency of the small pores of these membranes (see Table).

| P 2(Torr) | dp(Torr) | H$_2$/Ar | H$_2$/CO | H$_2$/i-Bu | H$_2$/N$_2$ |
|---|---|---|---|---|---|
| 760 | 310 | 2.8 | 3.9 | 1.1 | 3.5 |
| 50 | 930 | 6.4 | 15.3 | 1.3 | 3 |
| 10 | 980 | 10.9 | — | 7.1 | 7 |
| 1 | 1010 | 28.2 | 29.6 | 8.5 | — |

EXAMPLE 3

Figure 4:
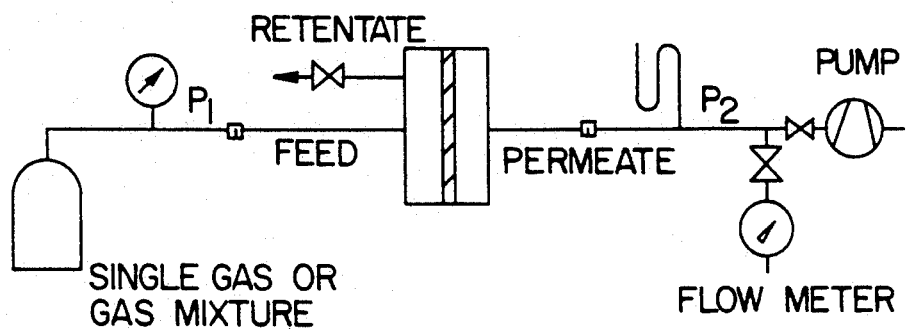
FIG. 4 is a schematic view of another apparatus for use of a novel capillary for gas permeation.

A flat alumina membrane (diameter 48 mm, pore size 20 nm) from the company ANOTEC was coated with a silica membrane through e-beam evaporation of quarz in an evaporation chamber as described in Example 1. The evaporation at a rate of 15 nm/min was terminated at a layer thickness of 520 nm. The membrane on the alumina support was mounted in an apparatus as shown in FIG. 4. The gas permeation of helium and of hydrogen showed a separation factor of 1.7–1.9 at 0.2 bar excess pressure and 1.6–1.7 at 0.5 bar excess pressure, which is significantly better than the Knudsen limit of 1.4.

EXAMPLE 4

A Vycor glass membrane from Corning (diameter 47 mm, thickness 2 mm) was coated with a silica membrane, thickness 1000 nm, by e-beam evaporation of quarz as described in Example 1. This membrane was mounted in a stainless steel filtration unit (Sartorius) and apple juice with pH of 5.4 was filtered through this membrane at a hydrostatic pressure of 1 m. The permeate was clear colorless water of neutral pH and taste.

I claim:

1. A supported continuous inorganic membrane wherein at least about 90% of the pores of the membrane have an effective diameter between about 0.3 and 1.2 nm and are of substantially the same pore size.

2. A supported membrane according to claim 1, wherein at least about 70% by weight of the membrane comprises at least one member selected from the group consisting of silica, titania, alumina, zirconia, cerium oxide, spinel, mullite, silicon carbide, silicon nitride and titanium nitride.

3. A supported membrane according to claim 1, wherein the pore diameter of the membrane is between about 0.3 and 0.8 nm.

4. A supported membrane according to claim 1, wherein the membrane has a porosity between about 5 and 70%.

5. A supported membrane according to claim 1, wherein the membrane is from about 10 to 10,000 nm in thickness.

6. A supported membrane according to claim 1, wherein the membrane is from about 50 to 200 nm in thickness.

7. A supported membrane according to claim 1, produced by evaporating the membrane material by an e-beam in a vacuum under a pressure of at most about 10 torr and depositing the vapor onto a porous support material at a temperature between about −20° to 400° C.

8. A supported membrane according to claim 1, produced by thermally evaporating the membrane material onto a porous support material at a temperature between about −20° and 400° C.

9. A supported membrane according to claim 1, produced by the Sol-Gel process and subsequent calcination.

10. In the separation of a gas or a liquid from a mixture by filtration through a filter material, the improvement which comprises using as the filter material a membrane according to claim 1.

11. The method according to claim 10, wherein the mixture subjected to filtration is a gas mixture with a separation factor larger than the Knudsen limit $(M_1/M_2)^{-2}$.

12. The method according to claim 10, wherein the mixture subjected to filtration is a solution, the solvent selectively passing through the membrane thereby to effect concentration of the dissolved material in the solvent which does not pass through the membrane.

13. The method according to claim 10, wherein the material subjected to filtration is a fruit juice, water selectively passing through the membrane.

14. The method according to claim 10, wherein the material subjected to filtration is contaminated water, water selectively passing through the membrane.

* * * * *